US009492696B2

(12) United States Patent
Ringer

(10) Patent No.: US 9,492,696 B2
(45) Date of Patent: Nov. 15, 2016

(54) DRY PILOT ACTUATOR

(75) Inventor: Yoram Ringer, Providence, RI (US)

(73) Assignee: Tyco Fire Products LP, Lansdale, PA (US)

( * ) Notice: Subject to any disclaimer, the term of this patent is extended or adjusted under 35 U.S.C. 154(b) by 434 days.

(21) Appl. No.: 13/981,880

(22) PCT Filed: Feb. 16, 2012

(86) PCT No.: PCT/US2012/025504
§ 371 (c)(1),
(2), (4) Date: Mar. 12, 2014

(87) PCT Pub. No.: WO2012/112808
PCT Pub. Date: Aug. 23, 2012

(65) Prior Publication Data
US 2014/0182865 A1 Jul. 3, 2014

Related U.S. Application Data

(60) Provisional application No. 61/443,680, filed on Feb. 16, 2011.

(51) Int. Cl.
A62C 35/68 (2006.01)
A62C 35/62 (2006.01)
F16K 31/122 (2006.01)
(52) U.S. Cl.
CPC ............... *A62C 35/68* (2013.01); *A62C 35/62* (2013.01); *F16K 31/1221* (2013.01)
(58) Field of Classification Search
CPC .... A62C 35/62; A62C 35/64; A62C 35/645; A62C 35/68
See application file for complete search history.

(56) References Cited

U.S. PATENT DOCUMENTS

| 3,292,709 | A | * | 12/1966 | Hodgman, Jr. | ........ | A62C 35/62 169/21 |
| 3,589,445 | A | * | 6/1971 | Juliano | .................. | A62C 35/66 169/17 |
| 6,068,057 | A | * | 5/2000 | Beukema | ............... | A62C 35/62 169/17 |

(Continued)

FOREIGN PATENT DOCUMENTS

| GB | 99071 | 7/1965 |
| GB | 2045609 | 11/1980 |
| WO | WO 99/59679 | 11/1999 |

OTHER PUBLICATIONS

International Searching Authority, International Search Report and Written Opinion issued in International Application No. PCT/US2012/025504, Jan. 24, 2013, 10 pages.

(Continued)

*Primary Examiner* — Ryan Reis
(74) *Attorney, Agent, or Firm* — Perkins Coie LLP

(57) ABSTRACT

A dry pilot actuator provides for a high liquid to gas trip ratio. The actuator includes a housing having an interior surface defining an internal chamber with a central axis. The valve further includes a first inlet port; a second pilot port and a third drain port, each in communication with the internal chamber. A first actuator seat is disposed along the interior surface of the housing circumscribed about the central axis and a second actuator seat is circumscribed about the first actuator seat. A seal member having a sealed position and an open position is substantially aligned with the central axis of the housing in each of the sealed and open positions. The third port is isolated from the first and second port when the sealing member is in the sealed position, and in fluid communication with the first port when the sealing member is in the open position. The second port is isolated from the first and third ports when the sealing member is in the actuated position. A spring member biases the seal member toward the open position.

19 Claims, 11 Drawing Sheets

(56) References Cited

U.S. PATENT DOCUMENTS

| | | | | |
|---|---|---|---|---|
| 6,158,520 | A | * | 12/2000 | Reilly .................. A62C 35/68 169/17 |
| 6,293,348 | B1 | * | 9/2001 | Reilly .................. A62C 35/62 169/16 |
| 7,814,983 | B2 | | 10/2010 | Ringer |
| 2006/0021765 | A1 | | 2/2006 | Golinveaux |
| 2008/0277125 | A1 | | 11/2008 | Wilkins et al. |
| 2010/0071776 | A1 | | 3/2010 | Ringer et al. |

OTHER PUBLICATIONS

U.S. Appl. No. 61/443,680, filed Feb. 16, 2011. 118 pages.
Tyco Fire & Building Products, Model DV-5 Deluge Valve, Diaphragm Style,1-½..8 inch (DN40 thru DN200), Deluge System—Dry Pilot Actuator Datasheet, TFP1315, 16 pp., Mar. 2004.
Tyco Fire & Building Products, Model DP-1 Dry Pilot Actuator for Deluge and Preaction Systems Dry Pilot Release Service Datasheet, TFP 1380, 4 pp., May 2008.

* cited by examiner

DRY PILOT ACTUATOR

PRIORITY DATA AND INCORPORATION BY REFERENCE

This application is a 35 U.S.C. §371 application of International Application No. PCT/US2012/025504, filed Feb. 16, 2012, which claims the benefit of priority to U.S. Provisional Patent Application No. 61/443,680, filed Feb. 16, 2011, each of which is incorporated by reference in its entirety.

TECHNICAL FIELD

This invention relates generally to a differential fluid control valve, and more specifically relates to a dry pilot actuator for actuating a fluid control valve of a fire protection system.

BACKGROUND ART

An automatic sprinkler system is one of the most widely used devices for fire protection. These systems have sprinklers that are activated once the ambient temperature in an environment, such as a room or a building, exceeds a predetermined value. Once activated, the sprinklers distribute fire-extinguishing fluid, preferably water, in the room or building. A fire sprinkler system, depending on its specified configuration, is considered effective if it controls or suppresses a fire.

The sprinkler system can be provided with a water supply (e.g., a reservoir or a municipal water supply). Such supply may be separate from that used by a fire department. Regardless of the type of supply, the sprinkler system is provided with a main that enters the building to supply a riser. Connected at the riser are valves, meters, and, preferably, an alarm to sound when the system activates. Downstream of the riser, a usually horizontally disposed array of pipes extends throughout the fire compartment in the building. Other risers may feed distribution networks to systems in adjacent fire compartments. The sprinkler system can be provided in various configurations. In a wet-pipe system, used for example, in buildings having heated spaces for piping branch lines, all the system pipes contain a fire-fighting liquid, such as, water for immediate release through any sprinkler that is activated. In a dry-pipe system, used for example, in unheated areas, areas exposed to freezing, or areas where water leakage or unintended water discharge is normally undesirable or unacceptable such as, for example a residential occupancy, the pipes, risers, and feed mains, branch lines and other distribution pipes of the fire protection system may contain a dry gas (air or nitrogen or mixtures thereof) under pressure when the system is in a stand-by or unactuated condition. A valve is used to separate the pipes that contain the water. When heat from a fire activates a sprinkler, the gas escapes from the branch lines and the dry-pipe valve trips or actuates; water enters branch lines; and fire fighting begins as the sprinkler distributes the water.

One type of fluid control valve used to separate the gas filled pipes and liquid filled pipes is a diaphragm-type or diaphragm style valve, such as that shown in U.S. Patent Publication No. 2010/0071776, entitled "Fluid Control Valve Systems and Methods" or as shown in Tyco Fire Products published Data Sheet, TFP 1315 entitled, "Model DV-5 Deluge Valve, Diaphragm Style, 1-1.2 through 8 Inch (DN40 through DN 200) Deluge Systems—Dry Pilot Actuation." (March 2004) (hereinafter "TFP1315"), each of which is incorporated by reference in their entireties. To control the flow of fluid between the inlet $5a$ and the outlet $5b$ and the respective wet and dry portions of the system 100, the preferred control valve 5 uses an internal diaphragm member having a sealed position and an open position to control the flow of fluid through the valve so as to respectively prevent and permit the flow of fluid from the wet portion of the system to the dry portion of the system. The position of the diaphragm is preferably controlled by fluid pressure acting on the internal diaphragm member.

One manner in which to control the fluid pressure in the diaphragm chamber of a fluid control valve is by way of a dry pilot actuator which is shown, for example in FIG. 4 (Parts 1-3) of TFP 1315 and in the particular known embodiment of a dry pilot actuator of Tyco Fire Products Data Sheet TFP 1380, entitled "Model DP-1: Dry Pilot Actuator For Deluge And Preaction Systems Dry Pilot Release Service" (May 2008) (hereinafter "TFP1380") which is incorporated by reference in its entirety. The dry pilot actuator in TFP1380 also uses an internal diaphragm which acts against the fluid pressure in the diaphragm chamber of the fluid control valve to control actuation of the fluid control valve and displacement of the diaphragm member between its sealed and open positions. More specifically, gas pressure is used to regulate the position of the internal diaphragm of the pilot actuator to regulate the flow of fluid out of the diaphragm chamber of the fluid control valve so as to control the release of fluid from the wet portion of the system to the dry portion of the system. TFP1380 describes the minimum air pressure required to maintain the internal diaphragm of the dry pilot actuator in a sealed or closed position against a minimum water pressure of 20 psi. is about 25 psi.

There are patent publications which describe the control and monitor of dry type residential fire sprinkler protection systems. For example, U.S. Patent Publication No. 20080277125; U.S. patent application Ser. No. 11/916,419, entitled "Releasing Control Unit for Residential Fire Protection System," which is incorporated herein by reference in its entirety. U.S. Patent Publication No. 20080277125 describes an electrically operated solenoid control valve. It may be desirable to have mechanically operated fluid control; and in particular, a dry-pilot actuated fluid control in a residential dry pipe fire protection system. Moreover, there may be a desire to have a dry-pilot actuator that can be maintained in a sealed condition at lower sealing gas pressures. Furthermore, it may be desired to have a dry-pilot actuator with a mechanical configuration that can serve as an alternate option to a diaphragm-type dry pilot actuator.

DISCLOSURE OF INVENTION

Embodiments of the subject invention provide for preferred mechanically operated dry pilot actuator or valve arrangements and performance. In particular, the preferred embodiments described herein provide for a differential pressure fluid control actuation and more particularly dry pilot actuation of fluid flow with one or more preferred operating characteristics, e.g., high liquid to sealing/trip gas operating ratios that are preferably greater than six. In addition to providing for desired operating characteristics, the preferred actuator arrangements provide for an actuator valve that is normally biased open and preferably provides for an alternate configuration to known mechanical diaphragm-type dry-pilot actuators. Particular preferred embodiments of the invention described herein provide for a sealed and/or trip ratio greater than six (greater than 6:1)

in a mechanically operated dry-pilot actuator arrangement that can provide for dry-pilot actuated fluid control for use in a preferred dry pipe residential fire protection system.

One preferred embodiment of the invention provides a preferred dry pilot actuator for actuation of a control valve. The preferred actuator includes a housing having an interior surface defining an internal chamber with a central axis. A first actuator seat is disposed along the interior surface of the housing preferably circumscribed about the central axis, and a second actuator seat is disposed along the interior surface preferably circumscribed about the first actuator seat. A seal member defines a preferred sealed position engaged with the first actuator seat and the second valve seat. The seal member further defines an open position axially spaced from the first and second actuator seats. The actuator further includes at least one spring member preferably disposed between the interior surface of the housing and the seal member to bias the seal member toward the open position. The preferred dry pilot actuator further includes a first port proximate the first valve seat in communication with the internal chamber; a second port in communication with the internal chamber, and a third port in communication with the internal chamber. For the preferred actuator, the third port is isolated from the first and second port when the sealing member is in the sealed position; and when the sealing member is in the open position, the third port is in fluid communication with the first port; and the second port is isolated from the first and third port by the sealing member.

Another preferred embodiment of the invention provides for a residential fire protection system having a stand-by state and an actuated state. The system preferably includes a liquid supply piping system for supplying a liquid under a liquid pressure; a residential sprinkler piping system being filled with a gas under a gas pressure in the stand-by state, and a fluid control valve for controlling the flow of liquid from the liquid supply piping system into the residential sprinkler piping system upon transition of the fire protection system from the stand-by state to the actuated state, the control valve including a chamber for holding a pressurized fluid to prevent the flow of fluid through the control valve. The system further preferably includes a dry pilot actuator including: a housing having an interior surface defining an internal chamber with a central axis. A first actuator seat is preferably disposed along the interior surface of the housing circumscribed about the central axis; and a second actuator seat is preferably disposed and circumscribed about the first actuator seat. A sealing member preferably defines a sealed position within the actuator with the sealing member engaged with the first actuator seat and the second actuator seat. The sealing member further defines an open position axially spaced from the first and second actuator seats.

The preferred system dry pilot actuator further includes a first port proximate the first actuator seat and coupled to the chamber of the control valve to provide fluid communication between the chamber of the control valve and the internal chamber of the actuator. A second port is preferably coupled a gas source with a third port in communication with the internal chamber. The third port is preferably isolated from the first and second port when the sealing member is in the sealed position. The third port is preferably in fluid communication with the first port when the sealing member is in the open position to discharge the pressurized fluid from the chamber of the control valve to permit the flow of fluid through the control valve, and the second port is preferably isolated from each of the first and third ports by the sealing member when the sealing member is in the open position. For the preferred system, at least one spring member is preferably disposed between the interior surface of the housing and the seal member to bias the seal member toward the open position. More preferably, the spring member is located between the first and second actuator seats.

The preferred dry pilot actuator alone or in the system may include one or more of the following features additionally or in the alternative. For example, one embodiment he at least one spring member comprises at least one coil spring having a first end engaged with a portion of the interior surface of the actuator that includes the first actuator seat preferably between the first and second actuator seats. The second end of the coil is preferably engaged with a portion of the seal member that faces the first actuator seat. In another aspect, the at least one spring member a total spring force ranging from about 0.5 pounds-force (Lbs.-f) to about 7 Lbs-f. In one embodiment, the at least one spring member defines a spring length with the sealing member in the open position that is greater than spring length when the seal member is in the sealed position. Alternatively, the spring length in the open position of the sealing member can be less than when the sealing member is in the sealed position. In a preferred embodiment, each of the first and second actuator seats are preferably substantially circular, the first valve seat having a first diameter ranging from about ¼ inch to about ½ inch and a second valve seat having a second diameter ranging from about two inches to about 2⅛ inches.

Preferably, the seal member is centered about the central axis in the open position and the closed position. Moreover, the seal member is preferably supported in the open position within the housing only by a frictional engagement with the at least one spring member such that seal member is not supported by any other valve structure. In one embodiment of the dry pilot actuator the sealing member defines preferred a trip ratio of liquid trip pressure in pounds per square inch to gas trip pressure in pounds per square inch that ranges from 5:1 to 28:1; more preferably ranges from about 7:1 to about 15:1. The seal member, when in a sealed position with the first and second actuator seats, preferably defines an annular void, which is even more preferably in communication with the third or drain port of the preferred actuator. The seal member preferably comprises a cylindrical member or assembly, having a distal side opposed to the first and second valve seats and a proximal side opposite the first side. The distal side of the seal member preferably includes a first seal portion for engagement with the first actuator seat and a second seal portion for engagement with the second actuator seat in the sealed position. The proximal side includes a third seal portion for sealing the second port from the inner chamber in the open position. Preferably, the first port is an inlet port, the second port is a pilot port and the third port defines a drain port. The actuator in another embodiment, preferably includes a plunger member to engage the sealing member to locate the sealing surface against the liquid and gas valve seats. In an alternate embodiment, the residential sprinkler piping system includes PVC pipe and fittings and the gas pressure of the residential sprinkler piping is no more than 14 psi.

In another embodiment, a method of operating an actuator valve is provided where the preferably dry pilot actuator valve has a stand-by state defined by sealing member engaged with liquid valve seat and a gas valve seat formed along an internal surface of a housing of the valve and an actuated state defined by the sealing member spaced from the liquid valve seat and the gas valve seat. The method preferably includes establishing the stand-by state, which more particularly includes biasing the sealing member away from the liquid and gas valve seats with a spring element having a first end engaged with sealing member and a second end engaged with the internal surface. The preferred method further includes engaging a plunging member with the sealing member to locate the sealing member against the liquid and gas valve seats and applying a gas pressure ranging from about 3 psi to about 50 psi.; preferably 10 psi. to about 25 psi.; more preferably about 10 psi. to about 15 psi. and preferably no more than about 14 psi. against the sealing member. The method further preferably includes biasing the sealing member away from the liquid and gas valve seats with a liquid pressure ranging from about 20 psi. to about 250 psi. and disengaging the plunging member from the sealing member. The preferred method further preferably includes establishing a trip state, which particularly includes applying a ratio of liquid trip pressure in pounds per square inch to gas trip pressure in pounds per square inch that ranges from about 5 to about 28; preferably ranging from about 5 to about 17; more preferably ranging from about 5 to about 15 and even is more preferably about 17.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

FIG. 1 a schematic of a preferred sprinkler system;

MODE(S) FOR CARRYING OUT THE INVENTION

Figure 1:
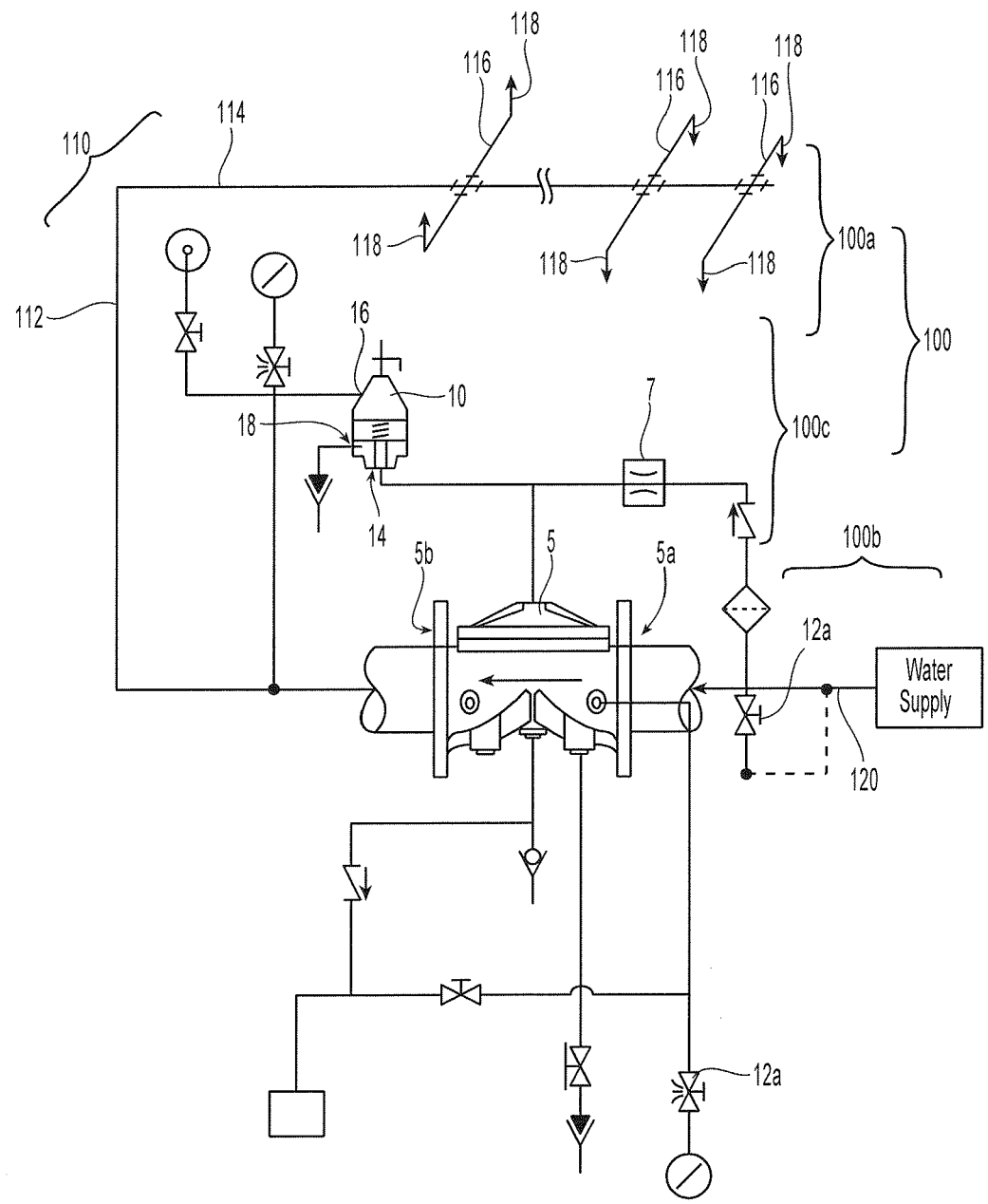

Shown in FIG. 1 is a schematic of a preferred embodiment of a dry sprinkler system 100 such as, for example, a commercial dry fire protection system. The system 100 includes a dry portion 100a and a wet portion 100b. The dry portion 100a is defined by a sprinkler piping 110 which preferably includes a riser pipe 112, a cross main line 114 and one or more branch lines 116 each having one or more sprinklers and more preferably, one or more sprinklers 118 for protection of the occupancy.

The system 100 has a stand-by state and an actuated state. In the stand by state, the dry portion 100a of the system is filled with a gas, such as, for example, with compressed air or nitrogen for a dry pipe or preaction dry sprinkler system. Alternatively, the dry portion 100a can be filled with atmospheric air, such as for example, in a deluge system. The wet portion 100b is defined by liquid supply piping 120 coupled to a liquid source such as, for example, a municipal water supply to provide a fire fighting liquid to the sprinklers. In the actuated state, such as for example when one or more sprinklers 118 is actuated by a sufficient amount of heat from a fire, the fire fighting liquid is delivered from the wet portion 100b of the system to the dry portion of the system 100a and the one or more sprinklers 118 for distribution of the fire fighting fluid over the occupancy.

The preferred sprinkler system 100 includes a riser or trim assembly 100c to place and maintain the system in its stand-by state. The riser assembly 100c further controls the delivery of fire fighting fluid from the wet portion 100b to the dry portion 100a and the sprinklers 118. To provide the desired fluid control, the preferred riser assembly 100c includes a fluid control valve 5 isolated by a first shut off valve 12a upstream of the fluid control valve to couple the fluid supply pipe 120 to the fluid control valve 5. The fluid control valve 5 is preferably a diaphragm-type or diaphragm style valve, such as that shown U.S. Patent Publication No. 2010/0071776 or as shown in Tyco Fire Products published Data Sheet, TFP 1315 (March 2004) (hereinafter "TFP1315"), each of which is incorporated by reference in their entireties. The fluid control valve 5 can be installed in the dry sprinkler system 100 which may be configured as any one of a dry pipe, dry preaction (single or double interlock), or deluge type dry sprinkler systems.

Figure 5:
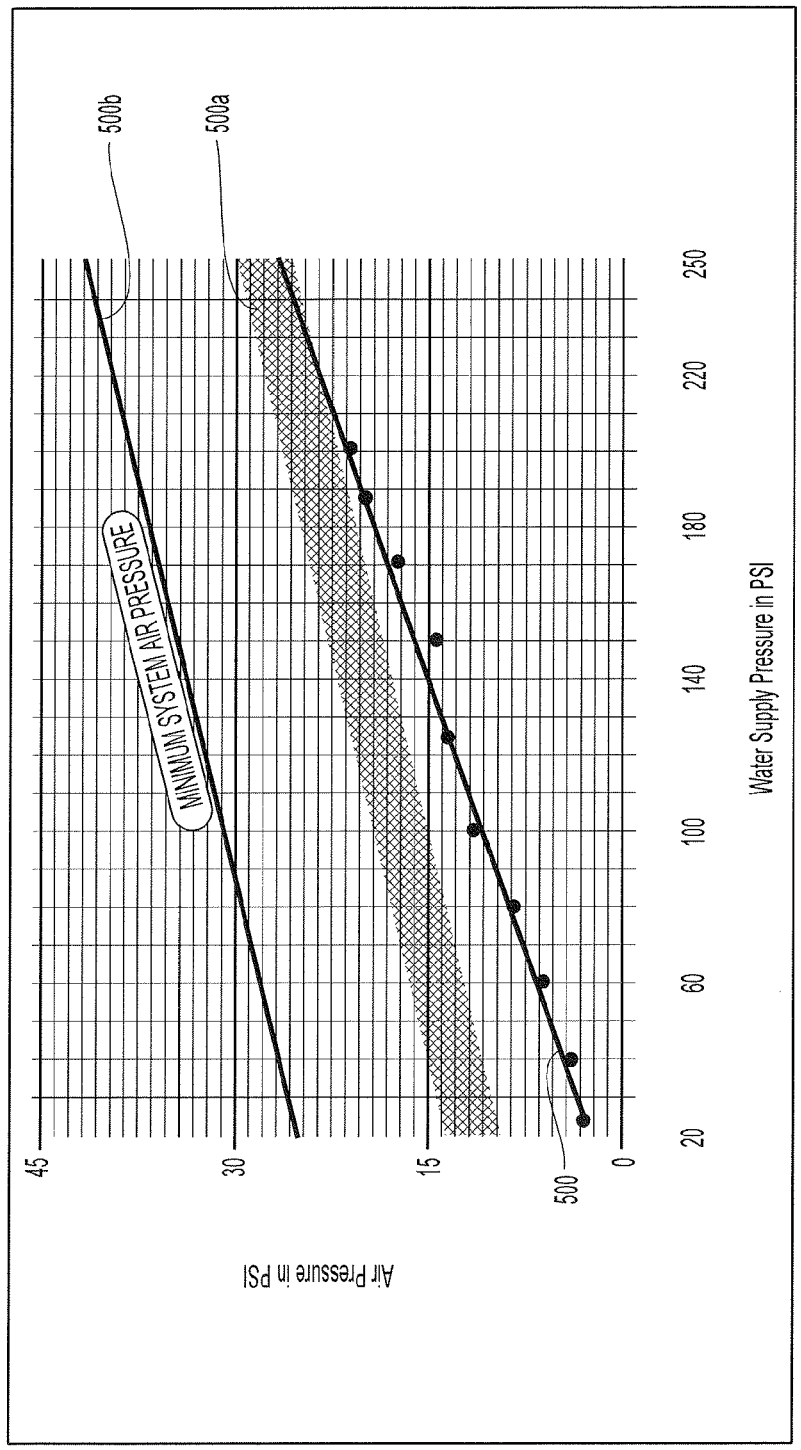
FIG. 5 is a performance plot of the actuator of FIG. 2 in a dry pipe arrangement.

Once installed within the trim assembly 100c, the control valve 5 includes an inlet 5a coupled to the wet portion 100b of the system and an outlet 5b coupled to the dry portion 100a. To control the flow of fluid between the inlet 5a and the outlet 5b and the respective wet and dry portions of the system 100, the preferred control valve 5 uses an internal diaphragm member having a sealed position and an open position to control the flow of fluid through the valve so as to respectively prevent and permit the flow of fluid from the wet portion of the system to the dry portion of the system. The position of the diaphragm is preferably controlled by fluid pressure acting on the internal diaphragm member. More specifically, the diaphragm member preferably defines a wall of a diaphragm chamber. Liquid from the liquid supply is piped into the diaphragm chamber, as schematically shown in FIG. 1, and its flow in and out of the diaphragm chamber is controlled to pressurize the diaphragm chamber and move the diaphragm member against or away from a seating surface of the valve so as to respectively form the sealed and open positions of the diaphragm. An illustrative example of an internal diaphragm member in a sealed position under a pressurized diaphragm chamber is shown in FIG. 5 of U.S. Patent Publication No. 2010/0071776. One manner in which to control the fluid pressure in the diaphragm chamber of the control valve 5 is by way of a novel dry pilot actuator 10, which is described herein in greater detail with respect to the various preferred embodiments below.

Referring again to the schematic of FIG. 1, shown is a general preferred piping schematic for dry pilot actuation of the fluid control valve 5. Fluid from the main water supply line 120 is piped through a restrictive orifice 7 to supply and pressurize the diaphragm chamber of the control valve 5 and provide fluid input to the preferred dry pilot actuator 10. The preferred actuator 10 is a differential fluid type actuator that includes a first inlet port 14, a second pilot port 16 and a third drain port 18 with an internal sealing member to control the flow of fluid through the internal volume of the actuator 10. The inlet port 14 is preferably coupled to the discharge from the orifice 7 and the feed line to the diaphragm chamber of the control valve 5. The drain port 18 is preferably open to atmosphere for discharge of fluid flow through the actuator in its actuated state. Alternatively, or in addition to, the preferred dry pilot actuator 10 can be piped or "trimmed" in a manner substantially similar to of the dry pilot actuator shown, for example, in TFP 1315.

The pilot port 16 is preferably coupled to a pressurized gas source to pressurize the internal volume of the actuator 10. For example, the pilot port 16 of the actuator may be coupled to the feed line of a pilot sprinkler in a deluge sprinkler system, in which the feed line of the pilot sprinkler is under a compressed gas pressure and the remaining sprinklers in the deluge system are open to atmosphere. Alternatively, in the case of the dry pipe or preaction systems, where the dry portion 100a contains a pressurized gas, the pilot port 16 of the actuator 10 may be coupled to piping of the dry portion 100a, subject to the system pressure. For the dry pipe or preaction system 100, the riser assembly 100c may be coupled to a compressed gas source to pressurize the main riser pipe 112 and the remainder of the dry portion 100a of the system to a system pressure that ranges, at a minimum, from about twenty-five pounds per square inch (25 psi.) to about fifty psi. (50 psi.). Higher pressures may be possible as permitted by the installation piping. More preferably, the preferred gas source pressurizes the dry portion 100a to a system pressure ranging from 10 psi to about 25 psi., and more preferably about 10 psi to about 15 psi., and even more preferably to no more than 14 psi. The gas source may be a portable or mountable compressor located proximate the trim assembly, or alternatively, the compressed gas may be supplied by a remotely located air compressor with compressed gas piping coupled to the riser pipe 112.

The installed actuator 10 controls fluid pressure in the diaphragm chamber of the control valve 5 so as to either maintain the fluid control valve 5 in the sealed state or actuate the valve 5 for the delivery of liquid from the wet portion 100b to the sprinklers 118 of the dry portion 100a of the system 100. The preferred actuator 10 is preferably a high differential fluid control valve that, in response to a high differential ratio (e.g. greater than 6) the actuator trips or operates to permit liquid to flow from the actuator inlet 14 to the actuator outlet 18. Once the installed actuator 10 of trim assembly 100c is actuated, liquid is discharged from the actuator 10 at a greater rate than is discharged from the orifice 7. Accordingly, the liquid flows from the diaphragm chamber of the control valve 5 and out of the actuator drain port 18 at a faster rate than it is supplied to the diaphragm chamber by the orifice 7 and therefore the pressure in the chamber is reduced. Continuous reduction in the diaphragm chamber results in the diaphragm moving from the sealed position to the open position so as to actuate the valve 5 such that fluid flows from the wet portion to the dry portion of the system.

As an actuator and more preferably as a dry pilot differential fluid control actuator, the actuator 10 has a stand-by or sealed state in which the inlet port 14 is sealed preventing the flow of water from the inlet 14 to the drain port 18. The actuator 10 has an open or actuated state in which the inlet port 14 is in fluid communication with the drain port 18 so as to permit the flow of water from the inlet 14 to the drain port 18. As installed, the open state of actuator 10 preferably reduces the fluid pressure in the diaphragm chamber and trips or actuates the fluid control valve 5. As mentioned above, the actuator 10 may use the pressurized gas of the dry portion 100a or the gas of a pilot sprinkler in the system to seat a sealing element or member of the actuator 10 in the sealed state against the inlet liquid or water pressure at the inlet port 14. As detailed greater below, depending on the internal configuration of the preferred actuator 10, the sealed state of the actuator 10 can have a low sealing gas pressure for a relatively high liquid pressure at the inlet 14 of the valve. In particular, the preferred actuator 10 may be maintained in a sealed state with a minimum sealing gas pressure ranging from about 2 psi. to about 14 psi. for a minimum liquid pressure of about 20 psi., and a maximum sealing gas pressure ranging from about 15 psi. to about 30 psi. for a maximum liquid pressure of about 250 psi. Moreover, the preferred actuator 10 has a high trip ratio defined by the ratio of a given liquid pressure at the inlet 14 of the actuator to a gas trip pressure that is less than the minimum sealing pressure acting on the sealing member of the preferred actuator 10. Accordingly, the trip ratio defines the differential fluid pressure relationship at which the actuator operates or transitions from the sealed state to the open state. For one embodiment of the dry pilot actuator 10, the high trip ratio preferably ranges from about 7 to about 17, and more preferably ranges from about 5 to about 28.

Accordingly, because the preferred dry pilot actuator can maintain a sealed state at a low gas pressure to control the flow of a relatively higher liquid pressure and further trip open to the actuated state at an even lower pressure, the preferred actuator can be used in a dry residential fire protection sprinkler system. For such an installation, the control valve 5 is configured as a dry pipe valve and the pilot port 16 actuator 10 is coupled to the dry portion 100a of the system. The system gas pressure is at a preferred maximum 25 psi. and more preferably at a maximum of about 15 psi. and even more preferably no more than 14 psi. Thus, the low gas sealing pressures permit the preferred dry pilot actuator 10 to be used in combination with a control valve for a residential fire protection sprinkler system that includes plastic PVC piping or fittings preferably rated for use in residential fire protection systems and more preferably for use in residential dry sprinkler piping systems, as seen for example, in U.S. Patent Publication No. 2006/0021765 which is incorporated by reference. It is preferred that the system gas pressures for residential fire protection systems employing plastic piping not exceed 14 psi. The liquid water supply pressure at the inlet port 14 of the actuator 10 and at the inlet 5a would be preferably no more than 175 psi. for such residential systems.

Figure 2:
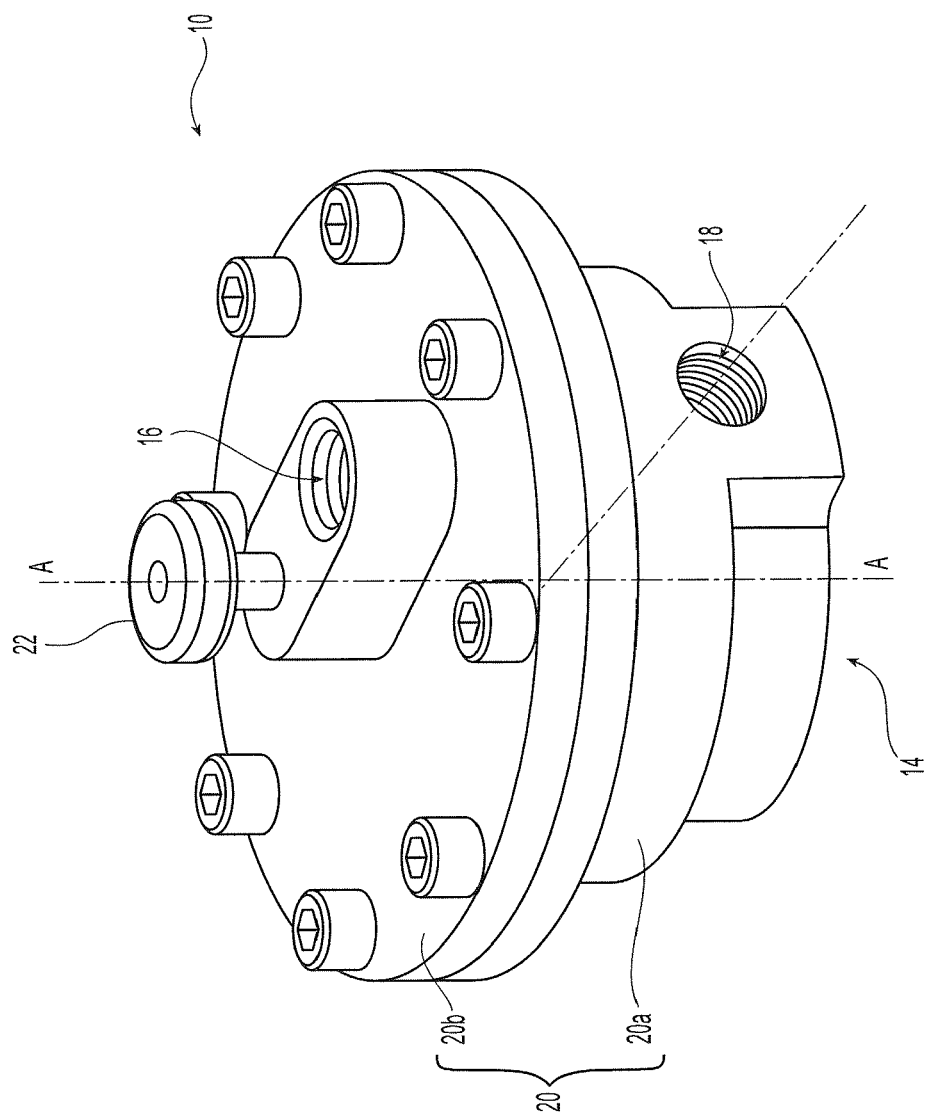
FIG. 2 is a perspective view of a preferred dry pilot actuator for use in the system of FIG. 1.
Figure 2A:
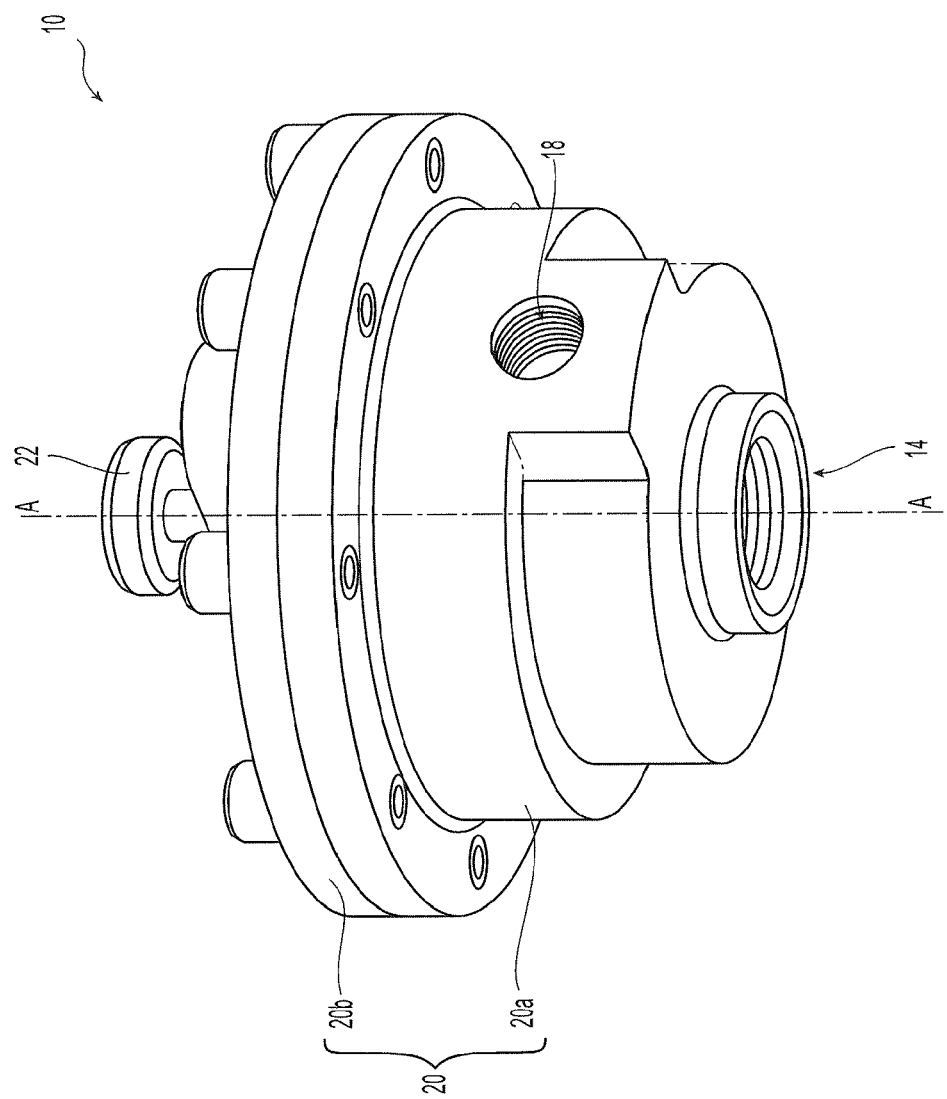
FIG. 2A is another perspective view of the actuator of FIG. 2.

Shown in FIGS. 2 and 2A is one preferred embodiment of a dry pilot actuator 10 for use in the above described fire protection sprinkler system. The actuator 10 includes a housing 20 preferably having a base or lower portion 20a and a cover or upper portion 20b which are preferably bolted together by a plurality of bolts or other fasteners radially arranged about the preferred mating flanges of the lower and upper portions 20a, 20b of the housing. The interface between the upper and lower portions 20a, 20b of the housing is preferably substantially circular. In one exemplary embodiment, the housing 20 defines a diameter ranging from about 2.5 inches to about three inches (3 in.); however, other dimension and/or configurations are possible. Preferably formed with the lower housing 20a are the inlet port 14 and the drain port 18. The pilot port 16 is preferably formed in the upper housing 20b. The ports may be alternatively located about the housing 20 provided the flow of fluids through the actuator 10 can be provided as described herein. Shown preferably engaged with the upper portion 20b of the housing is a plunger member 22 preferably disposed along a central axis A-A of the housing. The function of the plunger member 22 is explained in greater detail below.

Figure 3:
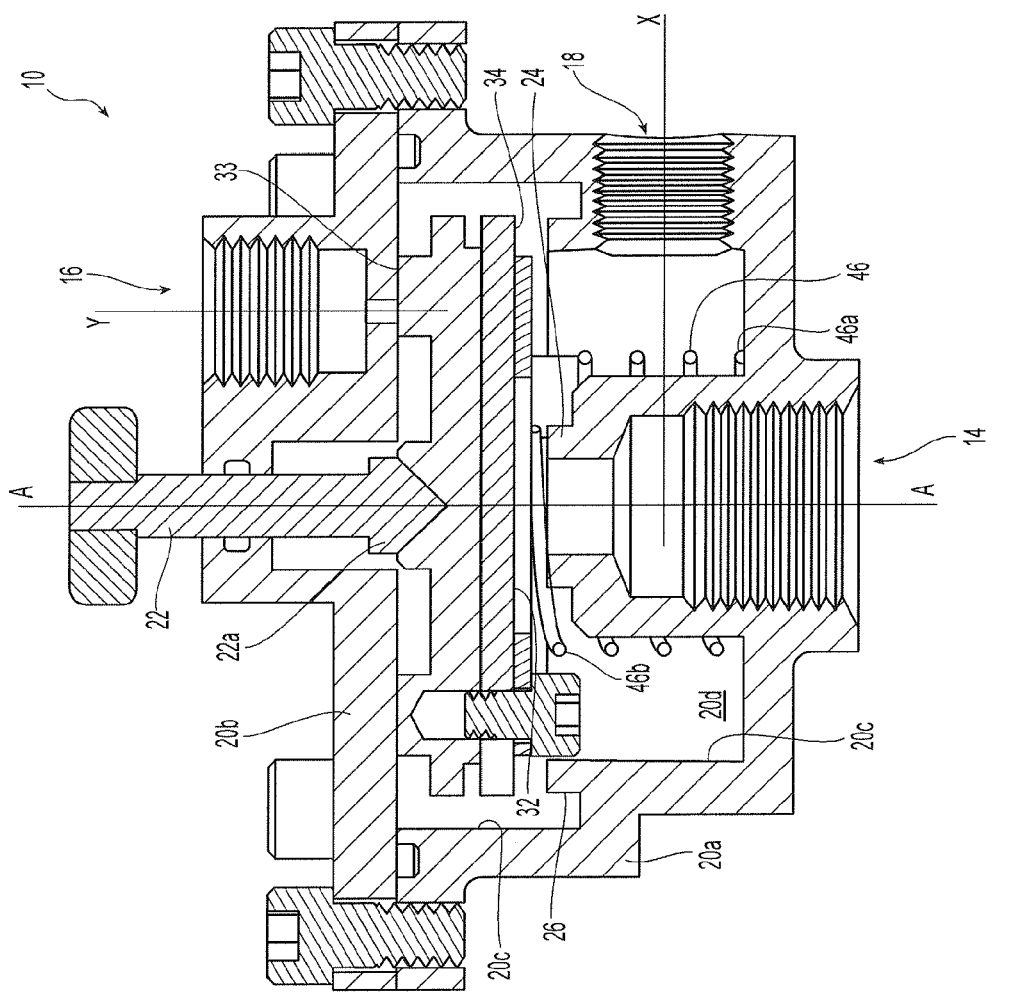
FIG. 3 is a cross-sectional view of the actuator of FIG. 2 in an open state.

Shown in FIG. 3 is a cross-sectional view of the preferred actuator 10. The upper and lower housings 20a, 20b cooperate together to form the interior surface 20c of the housing 20. The interior surface 20c further defines an internal volume or chamber 20d of the housing. As seen in FIGS. 3 and 3B, a first fluid or liquid actuator seat 24 is preferably formed along the interior surface 20c of the lower housing portion 20a and preferably centered or circumscribed about the central axis A-A of the housing proximate the inlet port 14. The liquid actuator seat 24 preferably provides for a raised transition in the interior surface profile from the inlet port 14 to the internal chamber 20d of the valve 10. The liquid actuator seat 24 is preferably circular and in one particular embodiment, preferably defines a seat diameter that is smaller than the nominal size of the inlet port 14. The cross-sectional area of the inlet port 14 is preferably larger than the cross-sectional area defined by the orifice 7 so as to facilitate the more rapid discharge of fluid from the diaphragm chamber of the control valve as compared to the liquid supply flow into the diaphragm chamber. In the preferred embodiment of FIG. 3, the liquid actuator seat 24 is smaller than the nominal size of the inlet port 14. In one exemplary embodiment, the liquid actuator seat ranges from about ¼ inch to about ½ inch and is more preferably about ½ inch in diameter. The liquid actuator seat 24 may define alternate dimensions and geometries such as a square, rectangular or other polygonal shape. The liquid actuator seat 24 further defines a first fluid or liquid sealing surface area to be sealed when the actuator is in the sealed state to prevent fluid at the inlet port 14 from flowing to the drain port 18. More specifically, the liquid sealing surface of the liquid actuator seat 24 is the planar surface area projection defined by the seat 24 to be sealed that is preferably perpendicular to the axis of flow or central axis A-A. For an exemplary embodiment of the actuator 10, the liquid sealing surface defined by the liquid valve seat 24 preferably ranges from about 0.05 square inches to about 0.2 square inches.

Also preferably formed along the interior surface 20c of the lower housing portion 20a is a second fluid or gas actuator seat 26 which preferably surrounds and is more preferably centered about the liquid actuator seat 24. The gas actuator seat 26 further defines a second fluid or preferably gas sealing surface area to be sealed to maintain the gas pressure for placing the actuator in the sealed state. More specifically, the gas sealing surface of the gas actuator seat 26 is the planar surface area projection defined by the gas seat 26 that is preferably perpendicular to the axis of flow or central axis A-A. As shown in the perspective cross-sectional view of FIG. 3B, the gas actuator seat 26 is preferably circular, but may define alternate geometries such as a square, rectangular or other polygonal shape.

For one exemplary embodiment having a circular gas actuator seat 26, the seat diameter preferably ranges from about two inches to about 2.25 inches (2.25 in.) and more preferably is about 2⅛ inch. Accordingly, the gas sealing surface defined by the gas actuator seat 26 is preferably about three-½ square inches (3.5 sq. inches) but may be alternatively sized to provide for the desired differential or ratio between the liquid pressure and the minimum gas sealing pressure as described herein. For the exemplary embodiment of the preferred dry pilot actuator, the ratio of gas sealing surface area to liquid sealing surface area to be sealed is preferably about 18:1. Alternatively, the sealing surface areas, angular orientations and/or their ratio may vary provided the resultant actuator seals and actuates substantially in a manner described herein and preferably provides a preferably designed and/or controlled high trip or actuation ratio.

Figure 3A:
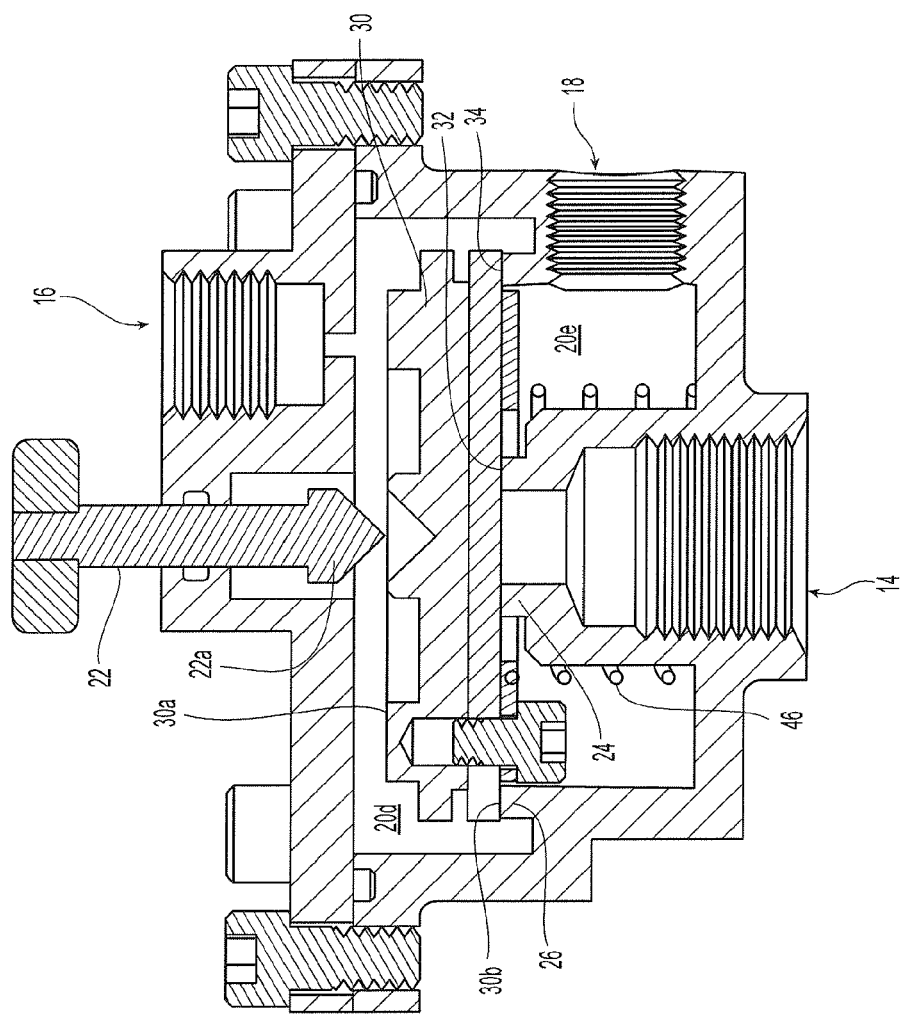
FIG. 3A is a cross-sectional view of the actuator of FIG. 2 in a sealed state.
Figure 3B:
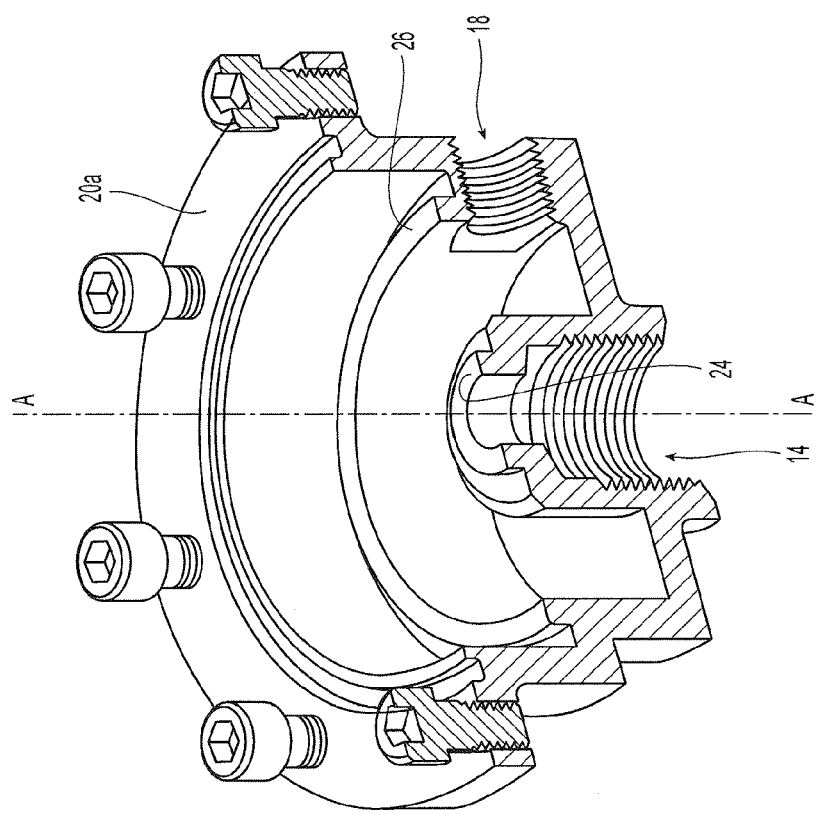
FIG. 3B is a perspective cross-sectional view of the interior surface of the actuator of FIG. 2.

Depending upon the unactuated or actuated state of the valve, as shown in FIGS. 3 and 3A, one or more of the preferred first through third ports 14, 16 and 18 is in fluid communication with the internal chamber 20d. In the preferred embodiment of the actuator 10, the inlet port 14 is preferably proximate the liquid valve seat 24 and axially aligned with the central axis A-A of the internal chamber of the housing 20 so as to define an inlet axis of flow that is centered with respect to the internal chamber of the actuator 10. The drain port 18 preferably defines an outlet axis X-X that is preferably orthogonal to the central axis A-A of the housing, and the pilot port 16 is preferably substantially parallel to and off-set to the central axis A-A. Other configurations of the inlet, drain and pilot ports are possible provided the configuration provides for operation of the actuator as described below.

To seal each of the liquid and gas sealing surface areas, the dry pilot actuator 10 includes a clapper assembly or sealing member 30 that is disposed within the internal chamber 20d. The sealing member 30 is a preferably substantially flat cylindrical assembly or plate that engages each of the liquid actuator or valve seat 24 and gas actuator or valve seat 26 in the sealed state of the valve, as seen in FIG. 3A, to form a fluid tight seal. In the sealed position, the sealing element or member 30 partitions the interior chamber to define a preferred annular sub-volume 20e of the chamber 20d that is in communication with the drain port 18. The drain port 18 is in communication with the annular sub-volume of the chamber 20e to provide a neutral volume of the actuator 10 that is preferably exposed to atmosphere. The annular sub-volume 20e and drain port 18 provide a vent for any build up of liquid or gas pressure to permit that actuator 10 to seal.

Figure 4:
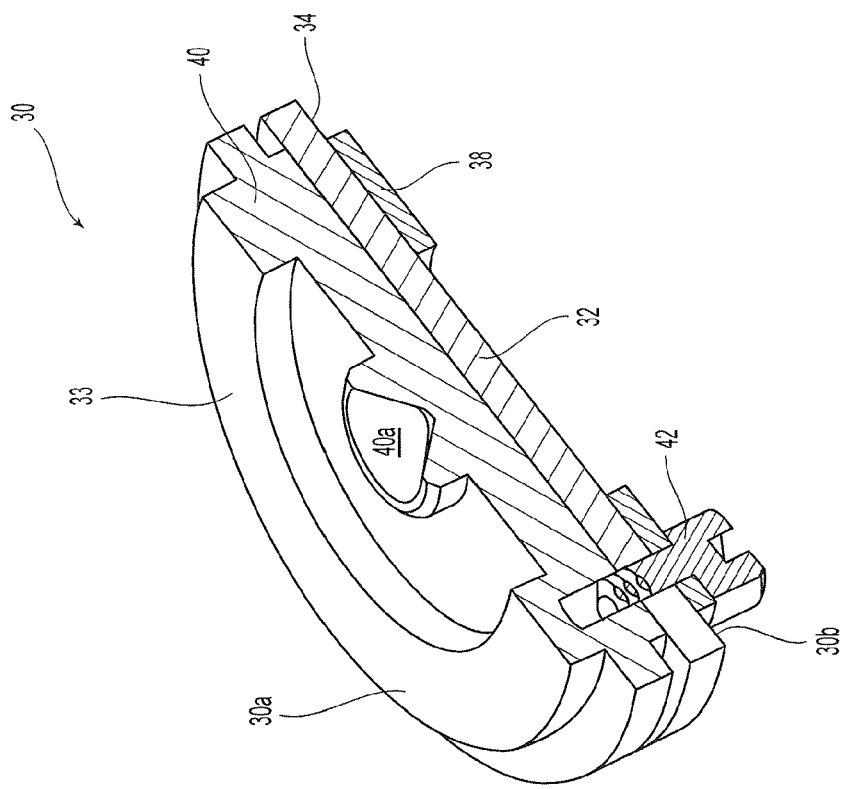
FIG. 4 is a perspective cross-sectional view of a preferred sealing member for use in the actuator of FIG. 2.

Referring to FIGS. 3 and 3A, as disposed in the internal chamber 20d, the sealing member 30 has a first proximal side 30a that preferably includes a sealing surface 33 that seals off the pilot port 16 from the internal chamber 20d when the actuator is in the actuated state. The sealing member 30 has an opposite second distal side 30b which faces and engages each of the liquid and gas actuator seats 24, 26. Accordingly, the sealing surface 30b preferably includes a first fluid or liquid sealing surface portion 32 and a second fluid or gas sealing portion 34. Each of the liquid and gas sealing portions 32, 34 are configured to engage the corresponding liquid and gas valve seat 24, 26 so as to each form a fluid tight seal. Accordingly, each sealing portion 32, 34 has a preferred geometry that corresponds to that of the valve seat to be engaged. Referring to FIG. 4 and the preferred sealing member 30, the liquid sealing portion 32 is preferably circular, and the gas sealing portion 34 is preferably circular and annular for respective engagement with the liquid and gas actuator seats 24, 26. In an exemplary embodiment of the actuator 10, the liquid sealing portion 32 defines a diameter ranging from about ¾ inch to about 1 inch, and the gas sealing portion 34 defines a diameter of about 2⅛ inches, centered about and circumscribing the liquid sealing portion 32.

Figure 4A:
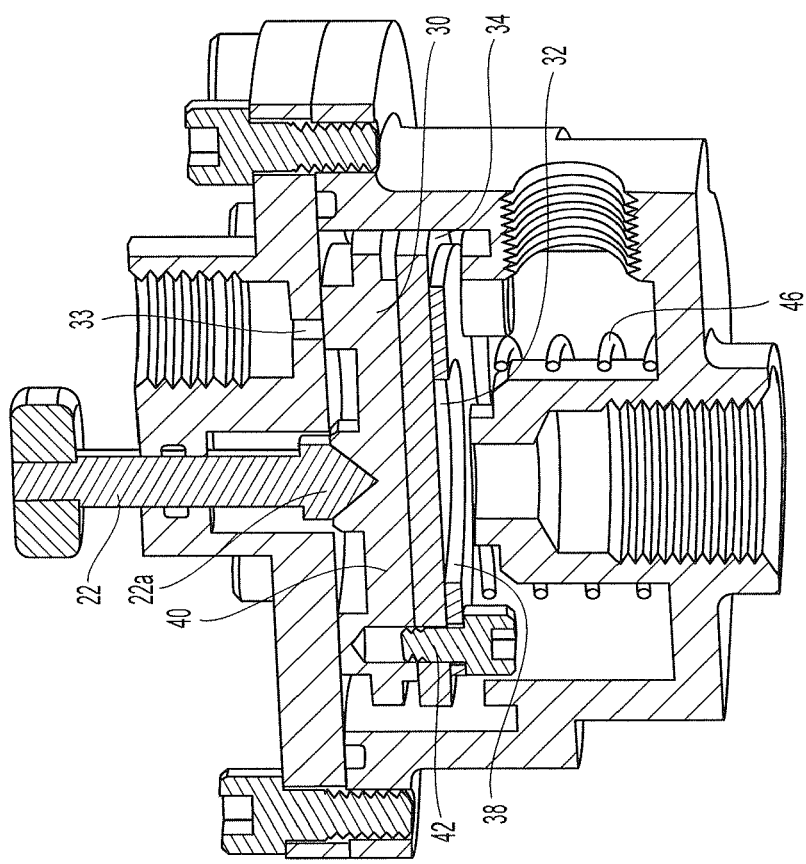
FIG. 4A is another perspective cross-sectional view of the actuator of FIG. 2.

One or more of the sealing surfaces of the sealing member 30 are preferably formed by one or more gaskets of an appropriate sealing material. Moreover, the sealing portions 32, 34 of the sealing element 30 can be configured to include self-sealing, self-aligning flexible cantilevered lips which engage the actuator liquid and gas seats 24, 26. Exemplary self-sealing, self-aligning cantilevered lips are shown and described, for example, in U.S. Pat. No. 7,814,983 at column 5, line 63 to column 6, line 16, and FIGS. 18 and 19, which is incorporated by reference. In addition, each of the liquid and gas sealing portions 32, 34 is preferably integrally or unitarily formed as part of a single flexible sealing gasket 36. Clapper or sealing member 30 is preferably an assembly in which the gasket 36 is disposed between a first distal plate 38 and a second proximal plate 40. Referring to the plan views of FIG. 4, the first plate 38 is preferably a substantially annular plate with the liquid sealing portion 32 disposed in the center of the annular plate such that the first plate 38 is located between the liquid sealing portion 32 and the gas sealing portion 38 of the sealing element. The second upper or proximal plate 40 is preferably circular having diameter slightly less than that of the maximum diameter defined by the gas sealing portion 34. Alternatively, the upper plate 40 can be any geometry provided the plate provides a seal at the pilot port 16 in the actuated state and sufficient support to the sealing element assembly 30 to form the effective seal in the sealed state. To secure the sealing element or clapper assembly together the plates 38, 40 are coupled together by one or more fasteners 42. As seen in FIGS. 3A, 4, and 4A the fasteners 42 are preferably threaded socket head cap screws extending through the first plate 38 and threaded into correspondingly threaded bores 44 formed in the second plate 40. Alternatively, the assembly 30 can be held together by other known fastening techniques so as to provide sufficient support to the gasket and formation of the seal under fluid pressure.

The preferred dry pilot actuator 10 is biased in the open state. Accordingly, the preferred open-biased actuator may provide a simpler installation by eliminating the need for additional latching to maintain the actuator open. In the preferred actuator or valve arrangement, the valve includes a spring member 46 to bias the sealing element 30 in the open position spaced from the liquid and gas valve seats 24, 26. The spring member 46 is preferably a coil spring having one end of the spring 46 engaged with the interior surface 20c of the valve housing and another end engaged with the sealing member 30. In the preferred embodiment of shown in FIGS. 3, 3A and 4A, the spring member 46 is a single coil spring axially aligned and centered along the valve center axis A-A. The preferred coil 46 spring has its first end 46a preferably disposed about the liquid valve seat 24 and more preferably disposed between the liquid valve seat 24 and gas valve seat 26. The second end 46b of the spring member 46 is preferably engaged with the distal surface 30b of the seal element 30 facing the valve seats 24, 26. Accordingly, the spring member 46 preferably defines a spring length greater in the open position of the sealing member 30 than in the sealed position of the sealing member 30.

Generally, the preferred dry pilot actuator arrangement provides for a normally or biased open actuator in which the sealing element of the actuator is biased toward the open position by a spring member disposed between the sealing member 30 and the sealing seats 24, 26 for the sealing member. Alternative arrangements are possible provided the valve sealing element is biased toward the open state and axially spaced away from the valve seats. For example, instead of a single spring member 46 centered about the liquid actuator seat 24, the spring member may include a plurality of springs arranged between the distal surface of the sealing element and the interior surface 20c of the valve housing between the liquid valve seat 24 and the gas valve seat 26. Another alternative may provide that the single spring member 46 tapers and/or surrounds and is centered about the larger gas valve seat 26. Further in the alternative, the spring member or members 46 may be disposed so as to engage other surfaces of the sealing element 30 and/or the actuator so long as the sealing element 30 is biased toward the open state. For example, the spring member 46 may appropriately bias the sealing member 30 toward the open state by engaging the proximal side 30a of the sealing member. Accordingly in such an arrangement, the spring member 46 would define a spring length that is smaller in the open position of the sealing member 30 than in the sealed position of the sealing member 30.

In order to locate the normally spaced sealing element 30 against the actuator seats 24, 26, the actuator 10 further preferably includes the elongate plunger member 22. The plunger member is preferably centered along the actuator axis A-A for sliding engagement within an opening in the upper portion 20b of the actuator housing. The opening in the housing may be sealed with an o-ring or other sealing material to ensure a fluid tight seal about the elongated plunger member 22. The plunger 22 preferably includes an enlarged first end 22a disposed within the internal chamber 20d of the valve. The enlarged end 22a engages a proximal portion of the sealing member or assembly 30, as seen for example in FIG. 3 and the plunger 22 can be translated axially so as to be locate the sealing element in the seated state against the valve seats 24, 26 of the actuator. With the sealing assembly 30 seated, the internal chamber 20d of the actuator 10 can be pressurized with a sufficient sealing pressure to maintain the actuator in the unactuated or sealed state. To facilitate the engagement between the plunger 22 and the sealing assembly 30, the proximal side 30a of the sealing member may include an engagement surface. For example, as seen in FIGS. 4 and 4A, the proximal plate 40 of the sealing assembly 30 includes a receptacle 40a that mates with the enlarged end portion 22a of the plunger 22 for cooperative engagement.

In the absence of a sufficient sealing pressure, the liquid supply pressure at the inlet port 14 and the biasing force of the spring 46 preferably axially translate the sealing assembly 30 from the sealed state in FIG. 3A to the actuated or open state of FIG. 3. Due to the preferred arrangement of the liquid and gas valve seats 24, 26 and sealing assembly 30 in combination with the preferred spring member 46, the sealing assembly 30 remains substantially aligned with the central axis A-A in each of the sealed state and open state. In particular, the liquid sealing portion 32 and the gas sealing portion 34 of the sealing assembly 30 substantially maintain the same orientation relative to the central axis A-A in each of the sealed state and open state. Accordingly, for the preferred valve 10, the sealing portions 32, 34 define geometries circumscribed and more preferably substantially centered about the central axis A-A in each of the sealed and open state. In addition or alternatively to, the seal member or assembly 30 defines substantially the same angular orientation with respect to the central axis A-A in each of the sealed and open states. For example, as seen in the sealed state of FIG. 3A and open state of FIG. 3, the sealing portions 32, 36 are preferably disposed in axially spaced planes oriented perpendicular to the central axis A-A. It should be understood that the components of the valve 10 need not be exactly axially aligned, but rather the components such as, for example, the valve seats 24, 26 or sealing portions 32, 34 or portions thereof may be slightly off-center or disposed in different planes with respect to one another provided the differential fluid control valve 10 properly forms a fluid seal and actuates to provide the desired fluid control using a high liquid to gas ratio in a manner as described herein.

In the preferred arrangement of the actuator 10 shown in FIGS. 3-3A; 4-4A, the sealing assembly 30 is supported and located in the open state by only the spring member 46. The preferred arrangement and orientation of the actuator 10 do not require that the sealing assembly 30 be fixed to the spring member 46 or any other dry pilot actuator structure. Relying on gravity and the frictional engagement with the spring member 46 renders the sealing assembly 30 essentially a "free-floating" clapper structure within internal chamber 20d of the actuator housing. The dry pilot actuator 10 may be alternatively configured to provide for the desired orientation of the sealing assembly 30. More specifically, the actuator 10 may include additional structure to support and locate the sealing assembly in the desired orientation. For example, the proximal surface of the sealing assembly 30 can include a projection for cooperative engagement with the upper housing portion 20a to maintain the desire orientation of the sealing assembly 30.

In order to place the installed actuator 10 and trim assembly 100c in service, the actuator 10 isolated from fluid pressure at its inlet 14, the plunger 22 is depressed to translate and locate the sealing element 30 in the seated position against the liquid and gas actuator seats. With the actuator 10 in fluid communication with the dry portion 100a of the system or pilot sprinkler, the internal chamber 20d of the actuator 10 is accordingly pressurized via pilot port 16 with a sealing pressure that ranges at a minimum from about 3 psi. to about 25 psi. up to a maximum of about 50 psi.

To place the actuator in stand-by service, the preferred orifice 7 is permitted to deliver a water pressure ranging from about 20 psi to about 250 psi. to the inlet port 14 of the actuator 10 and against the liquid sealing portion 32 of the sealing element 30. For the exemplary ½ inch liquid actuator seat 24, the gas pressure acts in opposition to both the liquid pressure and the bias of the spring member 46 so as to maintain the preferred 2⅛ inch gas sealing portion 34 of the sealing element 30 against the correspondingly sized gas actuator seat 26 so that the actuator 10 and system 100 are in a stand-by state. Accordingly, the enlarged end 22a of the plunger 22 can be disengaged from the sealing element or clapper assembly 30 such that the actuator 10 is maintained in the sealed state. With only gas pressure acting on the sealing assembly 30, the inlet 14 is sealed and fluid pressure is permitted to build and be maintained in the diaphragm chamber of the control valve 5 such that its internal diaphragm is seated in the sealed state thereby separating the dry and wet portions of the system 100 and maintaining the system in the in the stand-by state.

The ½ inch liquid actuator seat 24 and 2⅛ inch gas actuator seat are exemplary dimensioned embodiments for the dry pilot actuator 10 described herein. The actuator may be appropriately scaled or sized so as to provide for a different size of fluid inlet, outlet, liquid actuator seat or gas actuator seat to define a ratio of gas pressure to liquid pressure that maintains the actuator and or system in the sealed and stand-by state. More specifically, the valve dimensions may be configured so as to provide the static condition of the sealed state in which the gas pressure alone can maintain the sealing assembly 30 in the sealed state against both the liquid pressure at the inlet and the biasing force of the spring member 46. Any scaling in the size of the components of the dry pilot actuator 10 preferably provides for the high liquid to gas sealing ratio as described herein.

For the preferred valve configuration, the static gas and liquid pressure relationship is defined by:

$$((D_{Gas\ Actuator\ Seat}) \times \Pi/4) \times P_{Gas} = \text{Force}_{spring} + ((D_{Liquid\ Actuator\ Seat}) \times \Pi/4) \times P_{Liquid})$$

where $D_{Gas\ Actuator\ Seat}$=Diameter of the Gas Actuator Seat $D_{Liquid\ Actuator\ Seat}$=Diameter of the Liquid Actuator Seat $P_{Gas}$=Minimum Pressure of Gas required for sealed state of valve (Minimum sealing gas pressure)

$P_{Liquid}$=Pressure of Liquid at the inlet port of the valve $\text{Force}_{spring}$=Total spring force acting against the sealing assembly 30.

From the stand-by state of the system, the dry pilot actuator may be actuated by the loss of system gas pressure due to an actuated pilot sprinkler or system sprinkler 118. Eventually, the gas pressure at the pilot port 16 of the actuator is reduced below the minimum sealing gas pressure such that the actuator 10 is tripped or actuated from the sealed state to the actuated or open state. Under the incoming liquid pressure at its inlet 14 and the force of the spring member 46, the sealing assembly 30 is translated to the open state and liquid is permitted to flow from the inlet port 14 of the valve and out the drain port 18 of the actuator at a flow rate greater than that being supplied to the diaphragm chamber of the control valve 5 from the orifice 7. Accordingly, the reduced fluid pressure in the diaphragm chamber of the control valve 5 moves its internal diaphragm to the open position such that fluid flow from the control valve inlet 5a to the valve outlet 5b for delivery of water to the sprinkler of the dry portion. Moreover, to prevent flowing liquid from entering the pilot port 16 upon operation of the actuator 10, the proximal sealing surface 33 of the sealing member 30, in the open state, preferably engages the interior surface 20c of the upper housing so as to seal off fluid communication of the pilot port 16 from the internal chamber 20d thereby isolating the pilot port 16 from the inlet port 14 and the drain port 18.

Figure 5A:
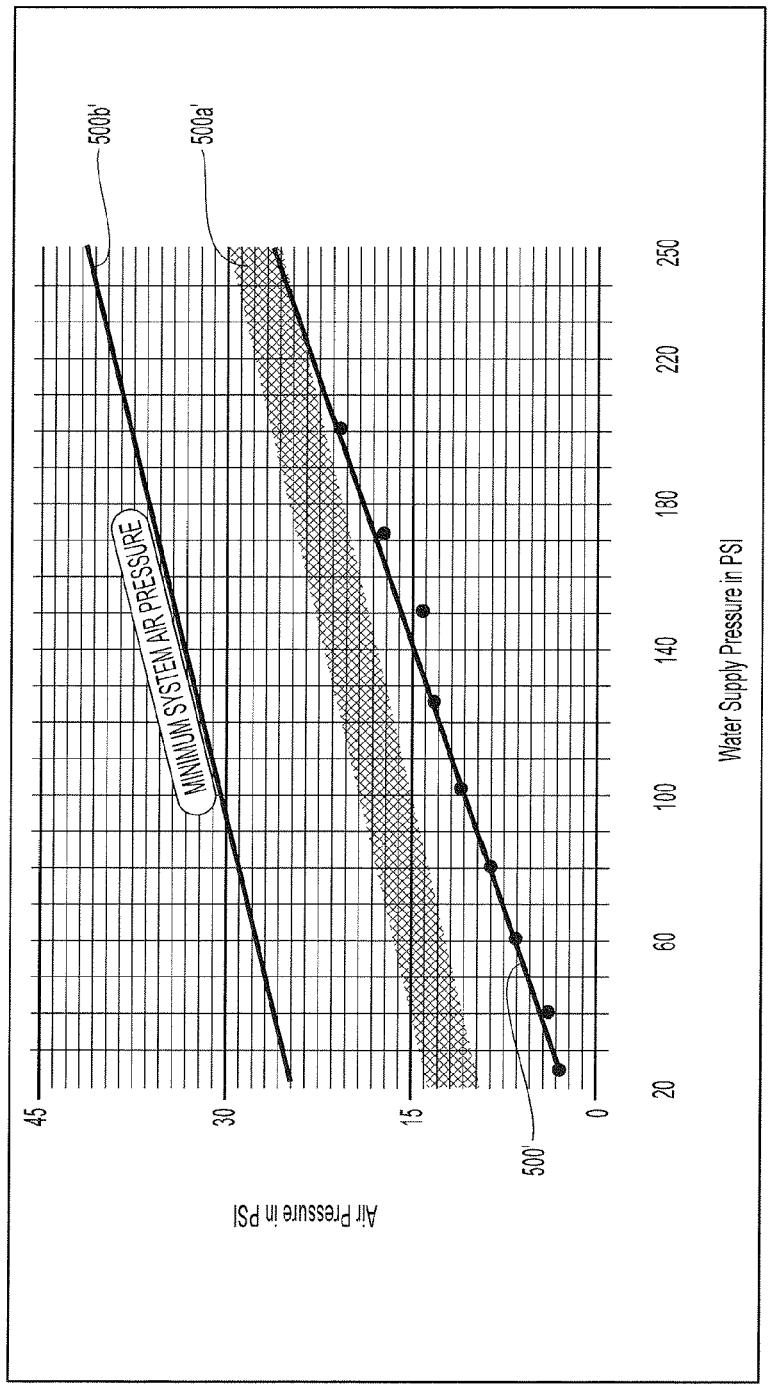
FIG. 5A is a performance plot of the actuator of FIG. 2 in a double-interlock preaction arrangement.
Figure 6:
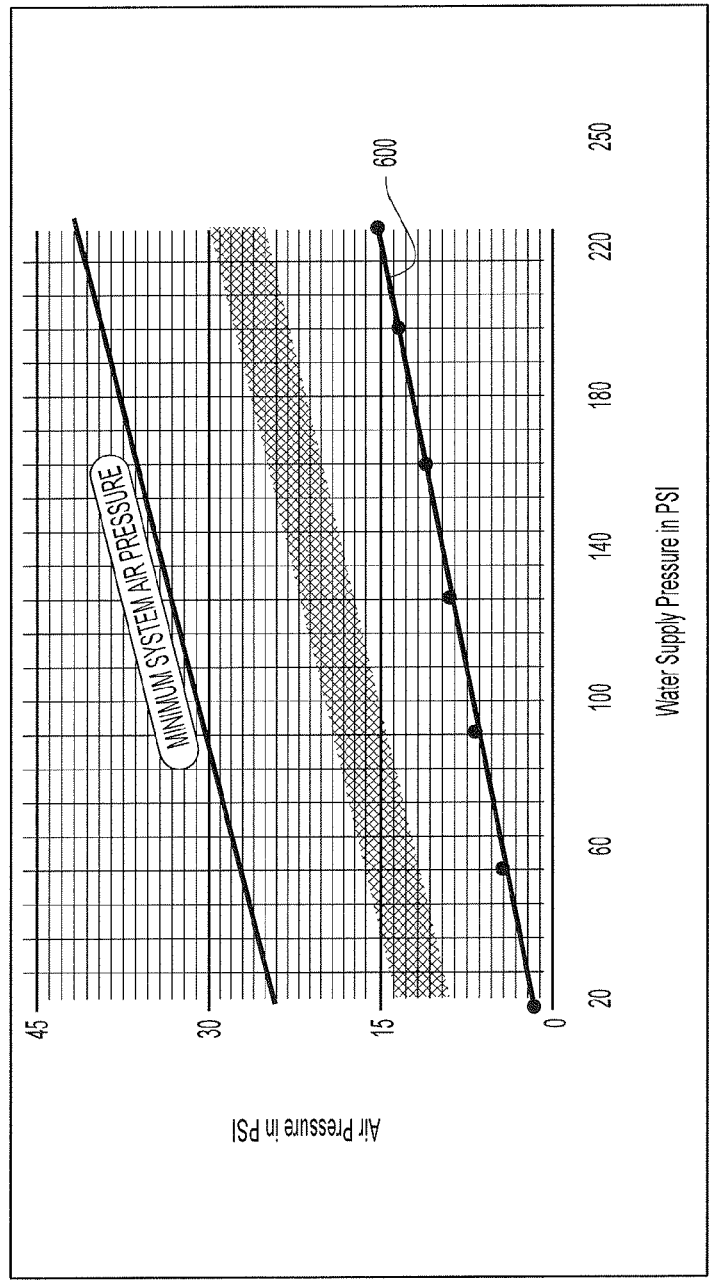
FIG. 6 is a theoretical performance plot of the actuator of FIG. 2.

In view of the above, the trip or actuating gas pressure of the actuator 10 is less than its minimum sealing gas pressure and therefore is also a function of the liquid inlet pressure and spring force. An exemplary embodiment of the dry pilot actuator 10 was tested for a range of inlet water pressures ranging from 20 psi. to 250 psi. and a total spring force $\text{Force}_{spring}$ of about 7 pounds-force (lbs.-f) to identify the gas or air pressure at which the valve would trip or actuate. FIG. 3 shows the test valve arrangement in which the liquid actuator seat 24 is about ½ inch in diameter and the gas actuator seat 26 is about 2⅛ inch. The exemplary dry pilot actuator 10 was tested with the fluid control valve 5: i) in a dry pipe valve configuration and ii) a double interlock pre-action configuration. The results of the tests are graphically shown in the respective plots 500 and 500' of FIGS. 5 and 5A. Provided for comparison in each plot, shown is the operational performance of a known dry pilot actuator and control valve arrangement: i) a known dry pipe valve configuration (plot 500a) and ii) a double interlock pre-action configuration (plots 500a'). A minimum system air pressure plot 500b, 500b' is provided in each of the FIGS. 5 and 5A. In each of FIGS. 5 and 5A, the preferred dry pilot actuator shifted the performance plot lower, at least for a range of water pressures, thereby lowering the range of available sealing pressures and further reducing the trip or actuation pressures. Accordingly, the preferred dry pilot actuator provides for high trip ratio (e.g., greater than 6) in a actuator and control valve arrangement. For comparison, the preferred theoretical actuator performance of the exemplary embodiment of the actuator 10 (only) is plotted at 600 in FIG. 6.

For the tested actuator and control valve arrangement, a trip ratio was determined for a given water inlet pressure and compressed air trip pressure. Under the test, the actuator-control valve trip ratio was determined to range from about 5 to about 10. According to the test results, the tested dry pilot actuator and control valve arrangement can be maintained in the sealed state by pressures well below the minimum system pressures of the dry system, i.e., below the minimum system air pressure range 500*b*, 500*b*' of (25-45 psi.). The inventor has also identified a theoretical range of trip ratios for at least the exemplary embodiment of the actuator 10 to be from about 7 to about 15.

As discussed above, the spring member 46 biases the clapper assembly 30 in the open state. For one particular embodiment of the spring member 46 the total spring force provided by the member 46 was identified to be about 0.5 Lbs.-f. However, it should be understood that the spring member 46 can be configured in various ways such that the dry pilot actuator 10 can properly seal and operate in a desired manner as described herein. In particular, the spring member 46 should provide a minimum spring force sufficient to axially extend the clapper or seal assembly 30 to the fully open position with the proximal surface 30*a* in sealed engagement at the pilot port 16 under only the weight of the clapper assembly 30 and in the absence of either a sealing gas pressure or liquid supply pressure. Moreover, the spring member 46 is preferably configured so as to provide the actuator 10 with the desired high trip ratio.

While the present invention has been disclosed with reference to certain embodiments, numerous modifications, alterations, and changes to the described embodiments are possible without departing from the sphere and scope of the present invention. Moreover, to the extent any features are claimed or described with an approximated numerical value or range of values, it should be understood that such approximated numerical value or range encompasses the stated numeral or numerical range along with a variability and/or tolerance that is to be expected for the described or claimed parameter, yet sufficiently specific to define the sphere and scope of the present invention as a whole. Accordingly, it is intended that the present invention not be limited to the described embodiments, but that it has the full scope defined by the language of the following claims, and equivalents thereof.

What is claimed is:

1. A dry pilot actuator comprising:
   a housing having an interior surface defining an internal chamber with a central axis;
   a first actuator seat disposed along the interior surface of the housing circumscribed about the central axis;
   a second actuator seat disposed along the interior surface and circumscribed about the first actuator seat;
   a seal member defining a sealed position engaged with the first actuator seat and the second actuator seat, the seal member further defining an open position axially spaced from the first and second actuator seats;
   a first port proximate the first actuator seat in communication with the internal chamber;
   a second port in communication with the internal chamber,
   a third port in communication with the internal chamber, the third port being isolated from the first and second port when the sealing member is in the sealed position; the third port being in fluid communication with the first port when the sealing member is in the open position, the second port being isolated from each of the first and third ports when the sealing member is in the open position; and
   at least one spring member disposed between the interior surface of the housing and the seal member to bias the seal member toward the open position.

2. The dry pilot actuator of claim 1, wherein the at least one spring member is located between the first and second actuator seats.

3. The dry pilot actuator of claim 1, wherein the at least one spring member comprises at least one coil spring having a first end engaged with a portion of the interior surface of the actuator that includes the first actuator seat, the coil spring having a second end engaged with a portion of the seal member that faces the first actuator seat.

4. The dry pilot actuator of claim 3, wherein the first end of the at least one coil spring is located between the first actuator seat and the second actuator seat.

5. The dry pilot actuator of claim 1, wherein the at least one spring member defines a total spring force of about 0.5 pounds-force (Lbs.-f).

6. The dry pilot actuator of claim 1, wherein the at least one spring member has a first length in the sealed position and a second length in the open position, the second length being greater than the first length.

7. The dry pilot actuator of claim 1, wherein the at least one spring member has a first length in the sealed position and a second length in the open position, the second length being less than the first length.

8. The dry pilot actuator of claim 1, wherein each of the first and second actuator seats are substantially circular, the first actuator seat having a first diameter ranging from about ¼ inch to about ½ inch and the second actuator seat having a second diameter ranging from about two inches to about 2⅛ inches.

9. The dry pilot actuator of claim 1, wherein the sealing member defines a trip ratio of liquid trip pressure in pounds per square inch to gas trip pressure in pounds per square inch that ranges from about 5 to about 28.

10. The dry pilot actuator of claim 1, wherein the seal member is in a sealed position and the first and second actuator seats define an annular void.

11. The dry pilot actuator of claim 1, wherein the seal member is in a sealed position and the first and second actuator seats define an annular void, the third port being in communication with the annular void.

12. The dry pilot actuator of claim 1, wherein the seal member is supported in the open position within the housing only by a frictional engagement with the at least one spring member such that the seal member is not supported by any other valve structure.

13. The dry pilot actuator of claim 1, further comprising a locating structure that includes a plunger member to engage the sealing member to locate the sealing surface against the first and second actuator seats.

14. The dry pilot actuator of claim 1, wherein the seal member comprises a cylindrical member, having a distal side opposed to the first and second actuator seats and a proximal side opposite the distal side, the distal side of the seal member includes a first seal portion for engagement with the first actuator seat and a second seal portion for engagement with the second actuator seat in the sealed position, the proximal side includes a third seal portion for sealing the second port from the inner chamber in the open position.

15. The dry pilot actuator of claim 1, wherein the first port is an inlet port, the second port is a pilot port and the third port defines a drain port.

16. A residential fire protection system having a stand-by state and an actuated state, the system comprising:
 a liquid supply piping system for supplying a liquid under a liquid pressure;
 a residential sprinkler piping system being filled with a gas under a gas pressure in the stand-by state,
 a fluid control valve for controlling the flow of liquid from the liquid supply piping system into the residential sprinkler piping system upon transition of the fire protection system from the stand-by state to the actuated state, the control valve including a chamber for holding a pressurized fluid to prevent the flow of fluid through the control valve; and
 a dry pilot actuator including:
  a housing having an interior surface defining an internal chamber with a central axis;
  a first actuator seat disposed along the interior surface of the housing circumscribed about the central axis;
  a second actuator seat disposed along the interior surface and circumscribed about the first actuator seat;
  a sealing member defining a sealed position with the sealing member engaged with the first actuator seat and the second actuator seat, the sealing member further defining an open position axially spaced from the first and second actuator seats;
  a first port proximate the first actuator seat and coupled to the chamber of the control valve to provide fluid communication between the chamber of the control valve and the internal chamber of the actuator;
  a second port coupled a gas source;
  a third port in communication with the internal chamber, the third port being isolated from the first and second port when the sealing member is in the sealed position; the third port being in fluid communication with the first port when the sealing member is in the open position to discharge the pressurized fluid from the chamber of the control valve to permit the flow of fluid through the control valve, the second port being isolated from each of the first and third ports by the sealing member when the sealing member is in the open position; and
  at least one spring member disposed between the interior surface of the housing and the seal member to bias the seal member toward the open position.

17. The system of claim 16, wherein the at least one spring member is located between the first and second actuator seats.

18. The system of claim 16, wherein the seal member is in a sealed position and the first and second actuator seats define an annular void in communication with the third port.

19. The system of claim 16, wherein the first port is an inlet port, the second port is a pilot port and the third port defines a drain port.

* * * * *